(Model.)

N. WHITCOMB & W. H. WAGER.
Hay Loader.

No. 243,418. Patented June 28, 1881.

WITNESSES
Fred. G. Dieterich
P. C. Dieterich

INVENTORS
Wm. H. Wager
N. Whitcomb
By his Attorneys
C. A. Snow & Co.

UNITED STATES PATENT OFFICE.

NOAH WHITCOMB AND WILLIAM H. WAGER, OF GENOA, ILLINOIS.

HAY-LOADER.

SPECIFICATION forming part of Letters Patent No. 243,418, dated June 28, 1881.

Application filed April 12, 1881. (Model.)

*To all whom it may concern:*

Be it known that we, NOAH WHITCOMB and WM. H. WAGER, of Genoa, in the county of De Kalb and State of Illinois, have invented certain new and useful Improvements in Hay-Loaders; and we do hereby declare that the following is a full, clear, and exact description of the invention, which will enable others skilled in the art to which it appertains to make and use the same, reference being had to the accompanying drawings, which form a part of this specification, and in which—

Figure 1:
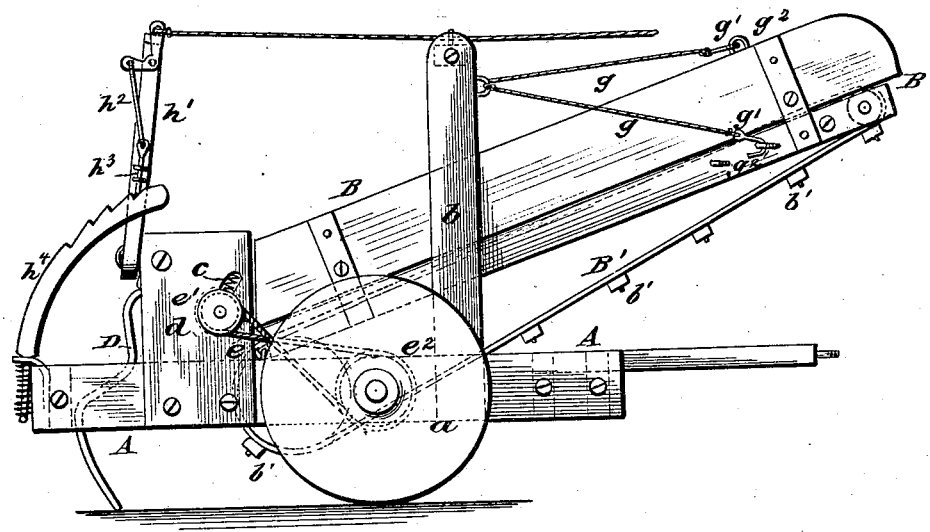
Figure 2:
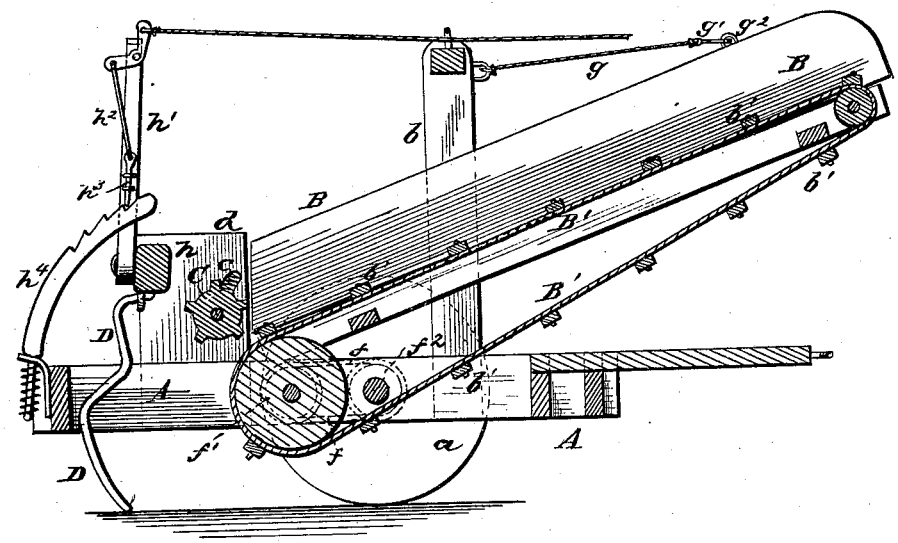
Figure 3:

Figure 1 is a side elevation of my improved hay-elevator. Fig. 2 is a longitudinal section, and Fig. 3 is a detailed view of the apron-slat spring-tooth.

This invention has relation to hay, &c., loaders or elevators, its object being to enable the ready taking up off the ground of the cut grass, after becoming hay, and the elevating of the same into a wagon to which the elevator or loader is attached; and it consists of the combination and construction of parts substantially as hereinafter more fully set forth.

Referring to the accompanying drawings, A is a truck or frame mounted centrally upon an axis having the transporting and driving wheels $a$ $a$. Secured in an upwardly-inclined position, between standards $b$ of said truck, is the elevator-frame B, having rolls at its ends encompassed by the elevator-apron B', having a series of toothed transverse slats, $b'$. Their teeth $B^2$ have each attached to it a spring, $b^2$, the normal action of which is to hold the point of the tooth, which passes through an aperture in the slat, about flush with the outer surface of the slat, while the spring itself is adapted to be acted upon by the lower roll of the apron as it reaches that point, and thus protrude or project the tooth and permit it to take up and place the hay upon the apron.

C is a corrugated or ribbed roll hung flexibly by springs $c$, bearing upon its axes in uprights $d$, fastened to the truck A, to aid the passing of the hay upon the apron. This roll receives motion by means of a belt, $e$, passing around a pulley, $e'$, upon its axis and around a pulley, $e^2$, fixed to revolve with the driving-wheel or its shaft. The apron receives its motion by a similar belt, $f$, passed around a pulley, $f'$, on the lower roll-shaft, and a second pulley, $f^2$, on the other driving or transporting wheel.

It will be noticed that the elevator apron-frame B, which is pivoted or hinged at its lower end to the truck-frame, is adapted to be adjustably held at the desired inclination or elevation to suit the height of the vehicle to which it is connected and which it is intended to load with the hay, by straps or cords $g$ $g$, with one end attached to the uprights $b$ and the other ends provided with hooks $g'$, capable of engagement with eyes or staples $g^2$, two or more, secured on each side of the elevator-frame.

D is a rake, with its rocking head $h$ pivoted or hung also in the uprights $d$, to further in taking up and placing the hay upon the apron or elevator proper. To operate the said rake any suitable mechanism may be employed.

Having thus fully described my invention, I claim and desire to secure by Letters Patent—

1. In a hay-elevator, the apron provided with slats $b'$, having flat springs $b^2$, carrying teeth $B^2$, which are forced out by contact of the springs with the main operating-roller, as set forth.

2. In a hay-elevator, the combination of the endless belt or apron having perforated slats $b'$, provided with springs $b^2$, carrying teeth $B^2$, the adjustable rake, and the fluted or corrugated roller C, suitably mounted and acted upon by springs $c$, as herein described, for the purpose set forth.

In testimony that we claim the foregoing as our own we have hereto affixed our signatures in presence of two witnesses.

NOAH WHITCOMB.
WILLIAM HENRY WAGER.

Witnesses:
C. S. BAILEY,
GEO. W. BALDWIN.